United States Patent [19]

Allard et al.

[11] 4,380,799

[45] Apr. 19, 1983

[54] SPEED CONTROL FOR AN AUTOMOBILE

[75] Inventors: Pierre-Yves Allard, Rueil; Gilles Leconte, Paris, both of France

[73] Assignee: Regie Nationale des Usines Renault, Boulogne-Billancourt, France

[21] Appl. No.: 159,342

[22] Filed: Jun. 13, 1980

[30] Foreign Application Priority Data

Jun. 29, 1979 [FR] France ................................ 79 16879

[51] Int. Cl.³ ........................ B60K 31/00; F02D 1/08; G05D 13/62
[52] U.S. Cl. .................................... 364/426; 123/342; 123/361; 123/396; 180/178
[58] Field of Search ................ 364/426; 123/337, 340, 123/342, 357, 352, 361, 396; 180/176, 177, 178, 179

[56] References Cited

U.S. PATENT DOCUMENTS 3,570,622  3/1971  Wisner .............................. 180/105
4,132,284  1/1979  Tomecek ....................... 123/396 X
4,181,103  1/1980  Sturdy ............................. 123/352 X
4,190,026  2/1980  Sakakibara ......................... 123/352
4,224,907  9/1980  Lefeuvre et al. ................... 123/352

FOREIGN PATENT DOCUMENTS

2330939  1/1975  Fed. Rep. of Germany .
1437083  5/1976  United Kingdom .
2009463  6/1979  United Kingdom .

*Primary Examiner*—Felix D. Gruber
*Attorney, Agent, or Firm*—Oblon, Fisher, Spivak, McClelland & Maier

[57] ABSTRACT

A mechanical connection between the accelerator pedal and the carburetor of an automobile which comprises, in particular, a control block controlled by an electronic computer, an epicyclic train controlled by a motorized reduction gear, a recopy potentiometer, a blade turning about the axis of symmetry of the epicyclic train and an electromagnet for blocking the accelerator pedal in a position corresponding to a friction point.

12 Claims, 9 Drawing Figures

SPEED CONTROL FOR AN AUTOMOBILE

BACKGROUND OF THE INVENTION

1. Field of the Invention

The present invention relates to improvements in a speed control for automobiles.

2. Description of the Prior Art

In a known driving aid device, which enables control and limitation of the speed of a vehicle, all mechanical connections between the accelerator pedal and carburetor butterfly valve have been eliminated. The opening and the closing movements of the carburetor butterfly valve are controlled by a motor which receives commands from a potentiometer. The noted movements are integral with those of the accelerator pedal through an electronic computer which is also connected to a sequential reference speed selection command, to a device for displaying the reference speed, to a vehicle or engine-speed sensor, and to the transmission, for the purpose of monitoring the gear ratio.

A friction point is associated with the accelerator pedal, corresponding to a change in a compression spring which constitutes a return means, against which the driver of the vehicle must act when he depresses the pedal. The friction point is set, for example, two-thirds of the way through the total travel of the pedal, and the return means comprises a compression spring which is precalibrated, for example, at 4 kg for the first two-thirds of the travel of the pedal, while the last third is precalibrated at 15 kg, for example.

The friction point is made to correspond to the preselected reference speed at which one wishes to travel and to which an engine speed N corresponds if one is traveling using the highest gear ratios of the transmission, and where the engine speed is given by the position of the accelerator pedal.

According to a variant, the displacements of the accelerator pedal are graduated in speed and the friction point corresponds to the preselected reference speed V.

SUMMARY OF THE INVENTION

The present invention concerns improvements in the aforementioned control. One improvement consists of reinstating a mechanical connection between the accelerator pedal and the carburetor butterfly valve. The mechanical connection is disposed in parallel with the electronic driving aid device so as to supplement the latter. Another mechanical connection, principally comprising a servo-motor in series with the mechanical connection and an electromagnet, enables the accelerator pedal to be blocked in stop position.

According to a practical embodiment, the servo-motor makes use of an epicyclic train which gives the multiplication ratio and causes, by action of the servo-motor on the planetary gear mount, the phase-lag of the butterfly valve control.

According to another embodiment, cables connected respectively to the accelerator pedal and to the butterfly valve drive pulleys of identical diameter. The accelerator pulley drives a potentiometer and, through a spring, a blade which, with the accelerator pedal depressed two-thirds of the way, encounters an electromagnet creating the possibility of blocking the assembly and stiffens the force required to push the accelerator pedal for the remaining one-third of its travel.

According to yet another embodiment, the speed control comprises a contact which detects the presence of slack in the cable connected to the butterfly valve and enables the servo-motor to readjust itself behind the accelerator pedal, thus enabling the driver to act immediately upon the butterfly valve in case of need. All slack is eliminated from the cable connection between accelerator pedal and butterfly valve, which can then be maintained under tension at all times.

According to the present invention, an electronic computer gives orders to the servo-motor which acts upon the series connection mechanically linking the accelerator pedal to the butterfly valve. This computer also controls the electromagnet which enables the pedal to be blocked.

According to the present invention, the computer receives: data originating from a speed sensor on the transmission and data from a potentiometer linked to the accelerator pedal; orders for preselection of speed, acceleration or deceleration in case of blocking or unblocking; and information regarding braking and disengagement of the clutch.

According to a characteristic of the invention, the servo-motor acting on the series connection, the potentiometer for monitoring the position of the pedal, and the blocking electromagnet are unified within a control block disposed in the path of the accelerator cable.

Advantageously, in the case of an automatic transmission, the kick-down switch is placed between the control block and the butterfly valve.

According to another characteristic of the invention, upon completion of each order by the servo-motor, the computer sends an inverse polarity pulse in order to stop the electric motor.

BRIEF DESCRIPTION OF THE DRAWINGS

Various other objects, features and attendant advantages of the present invention will be more fully appreciated as the same becomes better understood from the following detailed description when considered in connection with the accompanying drawings, wherein like reference characters designate like or corresponding parts throughout the several views, and wherein.

DETAILED DESCRIPTION OF THE PREFERRED EMBODIMENTS

Figures 1, 9:
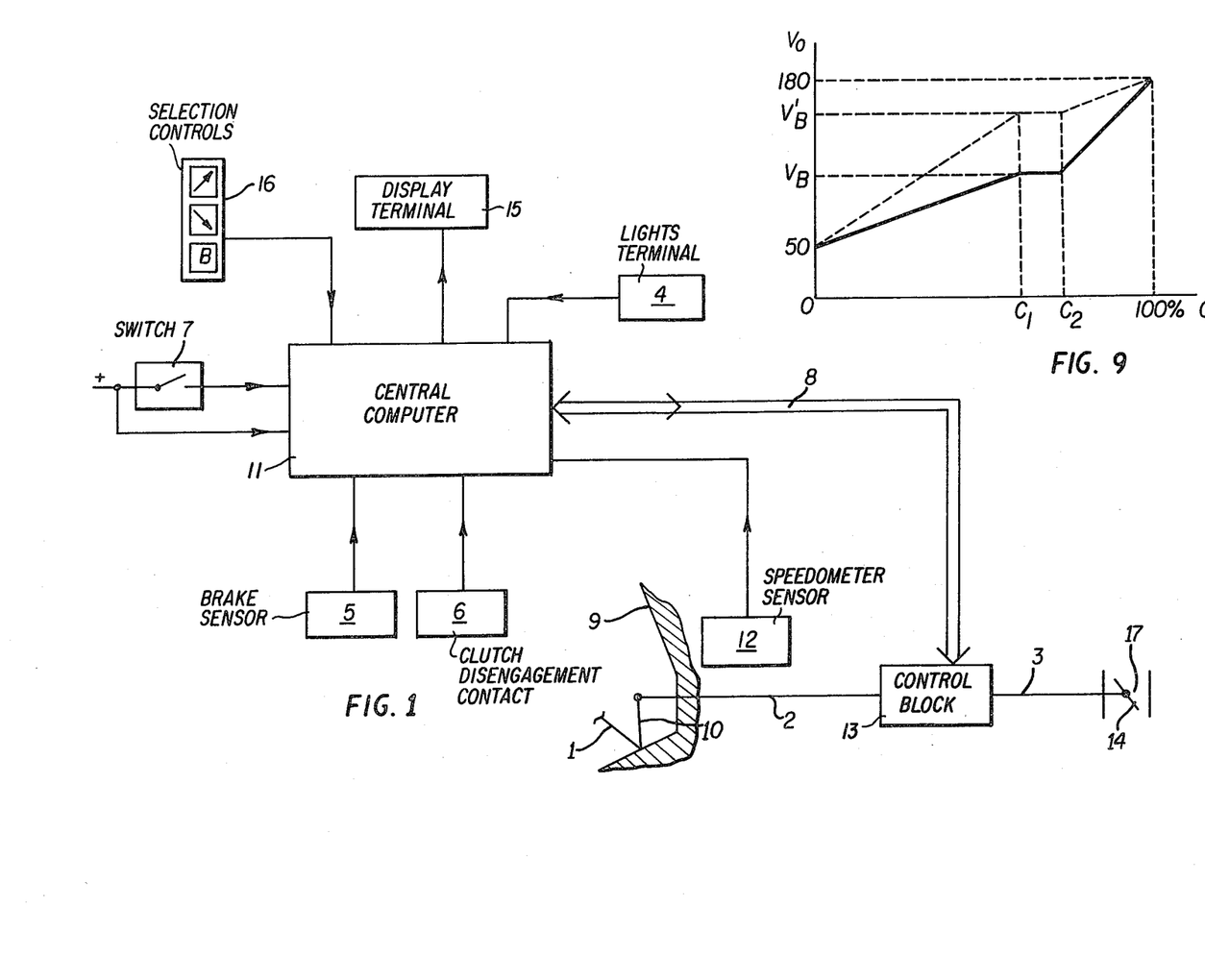
FIG. 1 illustrates, in the form of a block diagram, an embodiment of the speed control according to the present invention.
FIG. 9 illustrates curves which explain the operation of the control device of the invention.

According to the embodiment illustrated in FIG. 1, the accelerator pedal 1 of an automobile is connected to a control for butterfly valve 14 located in intake manifold 17, through a succession of elements. These elements include a bent lever 10 crossing through firewall 9 of the car and joining one end of accelerator cable 2, the second end of which is connected to control block 13, which in turn is connected by its output to the first end of butterfly valve cable 3, the second end of which is connected to the control link for butterfly valve 14. Control block 13 comprises in particular a servomotor enabling action upon the mechanical length of the connection between the accelerator pedal 1 and butterfly valve 14, an adjustable potentiometer dependent upon the position of the accelerator pedal in its travel, and electromagnetic blocking device, and a slackness detector enabling detection of any relaxation in the tension of the butterfly valve cable. The control block 13 is connected through an electrical connection 8, which comprises several parallel conductors making the necessary electrical connections, in both directions, with a central computer 11 which may be a type 8022 Intel microcomputer comprising an integrated analog-digital converter.

The computer 11 is further connected through inputs to an on-off switch 7 connected at the opposite end to the "post-contact positive" terminal of the vehicle, selection controls 16 disposed in immediate proximity to the fingers of the driver (e.g., on a part of the steering column, and comprising: an acceleration order, a deceleration order and a blocking order). These orders use push-button switches. Computer 11 is further connected through inputs to: a "positive lights" terminal 4, a braking sensor 5, a clutch disengagement contact 6, and a speed sensor 12 mounted, e.g., below the transmission in such a way as to know at all times the real speed of the vehicle. Finally, computer 11 is connected through outputs to a display terminal 15 disposed on the dashboard and enabling visualization of the preselected speed for the friction point on the accelerator pedal located, for example, two-thirds of the way through the travel of the latter and corresponding to a change in the effort required for its depression.

Figure 2:
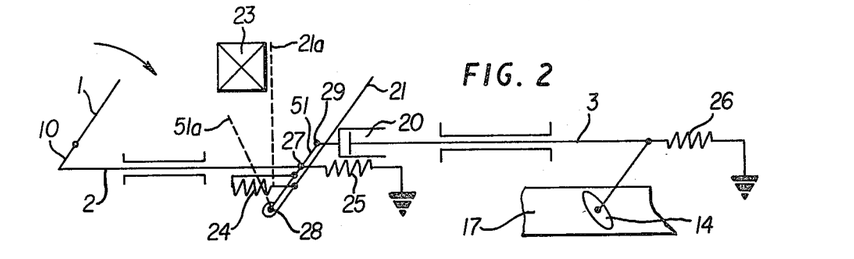
FIG. 2 schematically illustrates an embodiment of the mechanical connection between the accelerator pedal and the butterfly valve according to the present invention.

FIG. 2 illustrates, in schematic form, an embodiment of the mechanical connection between the accelerator pedal 1 and butterfly valve 14. At the end opposite accelerator pedal 1, accelerator cable 2 is connected at point 27 to a lever 51 capable of pivoting about axis 28. Cable 2 is maintained in a taut position by means of a spring 25 for returning accelerator pedal 1 to a rest position. A servo-motor 20, represented in the form of a piston, is connected through one of its components to point 29 of lever 51, while its second component is connected to one end of butterfly valve cable 3. FIG. 2 shows a blade 21 which is parallel to lever 51 and which is capable also of pivoting about axis 28. Blade 21 is shown by the broken line in position 21a, in contact with electromagnet 23, with lever 51 then in broken-line position 51a, a position totally distinct from that of the blade at 21a. Blade 21 is made of a magnetic material. A stop spring 24 is shown attached by its ends to blade 21 and lever 51. Stop spring 24 thus tends to maintain blade 21 and lever 51 in mutual contact in the course of their rotations about axis 28. However, once blade 21 has been blocked at 21a against electromagnet 23, if the driver continues to depress accelerator pedal 1 he may continue to cause lever 51 to turn alone, provided he overcomes the antagonistic force developed by stop spring 24. A return spring for butterfly valve 14 is shown in closed position at 26.

Figure 3:
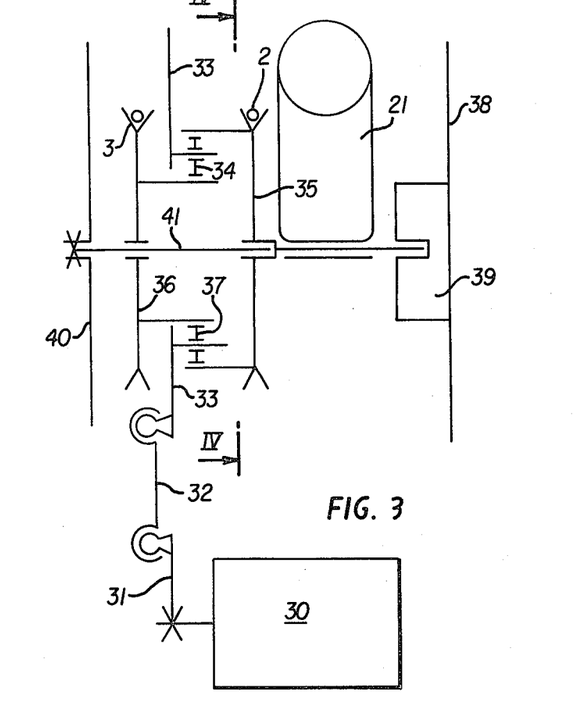
FIG. 3 illustrates, in cross-section through a plane passing through its longitudinal axis of symmetry, an embodiment of the servo-mechanism of the present invention.
Figure 4:
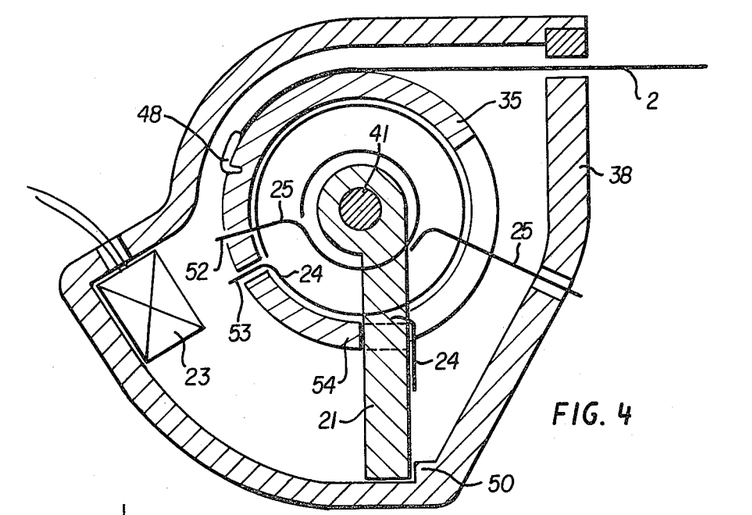
FIG. 4 illustrates, in cross-section through a plane defined by line IV—IV in FIG. 3, the preceding servo-mechanism.

FIG. 3 illustrates, in cross-section through a plane passing through its longitudinal axis of symmetry 41, the servo-motor 20 from FIG. 2 in the form of an epicyclic train. FIG. 4 illustrates a cross-section of the epicyclic trains through a plane defined by line IV—IV in FIG. 3, looked at in the direction of the arrows. At point 36 in FIG. 3 can be seen the butterfly pulley onto which is rolled cable 3, connected to butterfly valve 14, while at point 35 is the accelerator pulley, onto which is rolled cable 2, connected to accelerator pedal 1. In parallel to these pulleys 35 and 36 is disposed a plate 33 carrying planetary gears, two of which are shown in cross-section at 34 and 37 of FIG. 3. Three planetary gears are disclosed in FIG. 3. Planetary gear mount plate 33 is driven in rotation by motorized reduction gear 30 by means of drive crankpin 31 and link 32. Motorized reduction gear 30 operates under the control of the microcomputer 11 of FIG. 1. Accelerator pulley 35 is integral in its rotations about axis of symmetry 41 of the epicyclic trains with blade 21 and with adjustable potentiometer 39, which is dependent upon the travel of accelerator pedal 1 and which consequently provides an output voltage translating, at all times, the position of said accelerator pedal 1. The stationary part of adjustable potentiometer 39 is held by support 38, while the axis of symmetry 41 of the epicyclic train turns at its other end in flat support 40 parallel to support 38.

FIG. 4 clarifies certain details of the embodiment. In FIG. 4 there reappears electromagnet 23, with blade 21 turning about axis 41 with rest stop 50 provided on the inside of the housing 38 of the epicyclic train, and with cable 2 penetrating housing 38 and attached at 48 to accelerator pulley 35, which is capable of turning about axis 41. The stop located on accelerator pulley 35 for blade 21 is designated by numeral 54. The position of spring 25, for return of the accelerator pedal, is seen in FIG. 4 penetrating, at one end, housing 38, and accelerator pulley 35, passing around axis 41 and terminating at 52, embedded in butterfly pulley 36. Moreover, the position of stop spring 24, constituting the spring for blade 21, is seen in FIG. 4 at one of its ends, turning inside accelerator pulley 35 and butterfly valve pulley 36 and terminating at 53, embedded in butterfly valve pulley 36.

According to a preferred embodiment, accelerator pulley 35 comprises an inner set of teeth which, through planetary gears 34, 37, drives butterfly valve pulley 36, which is equipped with an outer gearing and which in turn drives butterfly valve cable 3. The playout ratio of accelerator cable 2 and butterfly valve cable 3 is determined by the ratio of the radii of the inner and outer gearings and by the ratio of the radii of the corresponding pulleys. Planetary gears 34, 37 are angularly disposed by planetary gear mount 33 which carries the axes of the planetary gears on which the latter turn. The angular position of planetary gear mount 33 is controlled through ball-joints and link 32 by motorized reduction gear 30 and its crankpin 31, which are electrically controlled by the control block of FIG. 1. The angular displacement of planetary gear mount 33 is angularly limited by two stops disposed on frame 38. The position of planetary gear mount 38 controls the phase-lag of the relative playout of accelerator cable 2 with respect to butterfly valve cable 3.

Figure 5:
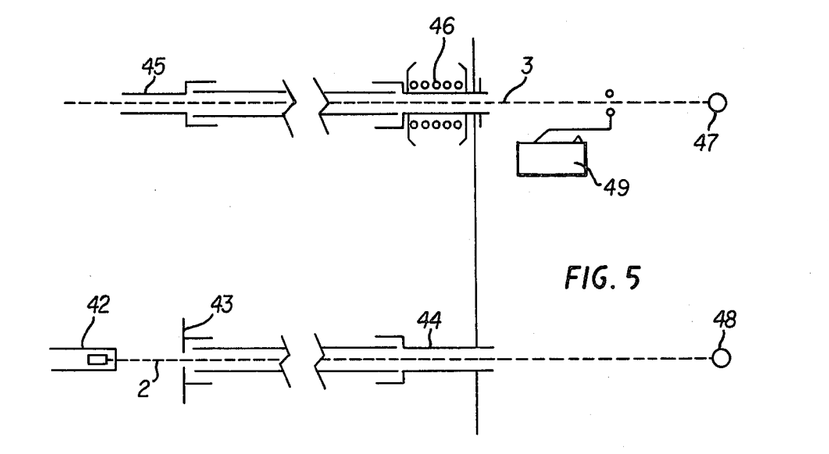
FIG. 5 illustrates the paths of the cables forming the mechanical connection of FIG. 2.

FIG. 5 illustrates the respective positions of accelerator cable 2 and butterfly valve cable 3 in their respective sheaths, along with the principal elements which accompany them. On accelerator cable 2, as noted successively from left to right, is provided a yoke 42 for fastening onto the accelerator pedal, a stationary sheath stop 43 at the passage through the firewall of the car, an adjustable sheath stop 44, and an end 48 which reappears at point 2 on the accelerator pulley 35 of FIG. 3. On butterfly valve cable 3 can be seen successively from left to right: an adjustable sheath inlet 45 on the butterfly valve tab; a stop 46 with a compensating spring having a travel of approximately 25 mm and corresponding to a force greater than or equal to that corresponding to maximum opening of the butterfly valve; and finally a slackness detector 49 and end 47, which reappears at 3 on the butterfly valve pulley 36 of FIG. 3.

Figure 6:
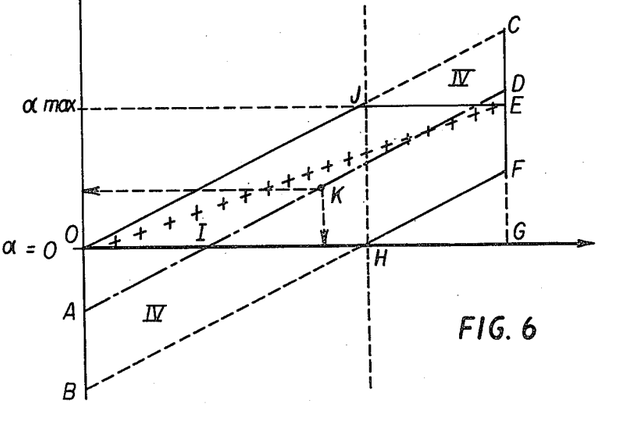
FIG. 6 defines several curves and several areas of the plane enabling the operation of the mechanical connection according to the present invention.

FIG. 6 represents on the X-axis, the length of the entire connection between accelerator pedal 1 and butterfly valve 14, and, on the Y-axis, the angle of opening α of butterfly valve 14 between zero and its maximum opening. Several curves are shown delimiting the operation of the mechanical connection in accordance with the invention. The law of variation represented by line OE and shown in crosses corresponds to a production vehicle. The law of variation represented by line OJC corresponds to a car equipped with "Normalur" (registered trademark) with the system out of service. The law of variation represented successively by lines OH and HF corresponds to a car equipped with the system of this invention and in operation, but with servo-mechanism 20 in a fully-closed position. The law with servo-mechanism 20 in a fully-open position then corresponds to line OJC, and the law of variation represented by line AD corresponds to an intermediate position of servo-mechanism 20. It can be seen, then, that depending upon the position of pedal 1 and the opening of servo-motor 20, common operating point K may be located in four distinct zones, viz.:

zone I corresponding to triangle OHJ;
zone II corresponding to triangle HJEF;
zone III corresponding to triangle JEC; and
zone IV corresponding to triangle BOH.

For zone I, there exists a possible fixed opening of butterfly valve 14, as is the case for zone II, where only the stiffness of the pedal is involved.

For zone III, the theoretical opening is greater than the maximum opening of the butterfly valve, which requires a compensation spring between servo-motor 20 and butterfly valve 14. The transmission kick-down order is given by this compensating spring, which is illustrated at 46 in FIG. 5. For zone IV, since butterfly valve 14 is already closed, control cable 3 of butterfly valve 14 is relaxed. A contact detecting this slackness, illustrated at 49 in FIG. 5, enables, without opening the butterfly valve, the servo-motor to be reset to a state where this slackness is eliminated, at the extreme, with the law of variation represented by line OH. After a lifting of the foot, the system is then in condition for opening of the butterfly valve. This occurs immediately upon application of pedal 1, without any idle time.

With regard to the law of force on the pedal, more or less the same law is retained through the first two-thirds of the travel, and supplementary force is added after that point due to the existence of stop spring 24 illustrated in FIGS. 2 and 3.

In a precise embodiment, planetary gear mount 33 turns between two stops 34° distant with respect to frame 40. Blade 21 turns approximately 35° with respect to accelerator pulley 35, between two stops. Blade 21 also turns 56 degrees and 40 minutes with respect to frame 38 and encounters electromagnet 23, which constitutes a stop. A spring 25 exists between accelerator pulley 35 and frame 38, and another spring 24 between accelerator pulley 35 and blade 21, as indicated above. The preferred solution thus makes use of an epicyclic train illustrated in FIG. 3 which gives the multiplication ratio and, by action of motorized reduction gear 30, on planetary gear mount 33, gives the phase-lag of the butterfly valve control. We have:

$$W_p = 1.5 W_a + 2.5 W_m$$

where: $W_p$ is the angular speed of rotation of butterfly pulley 36; $W_a$ is the angular speed of rotation of accelerator pulley 35; and $W_m$ is the angular speed of rotation of motor 30.

Accelerator cable 2 and bufferfly cable 3 drive, respectively, pulleys 35 and 36 of equal diameter. Accelerator pulley 35 drives potentiometer 39 and, through spring 24, blade 21 which, with pedal 1 two-thirds depressed, comes under the influence of electromagnet 23 of FIG. 2, with the possibility of blocking the assembly, and stiffens the law of force for the driver on pedal 1 for the remaining one-third of the distance of its travel.

Figure 7:
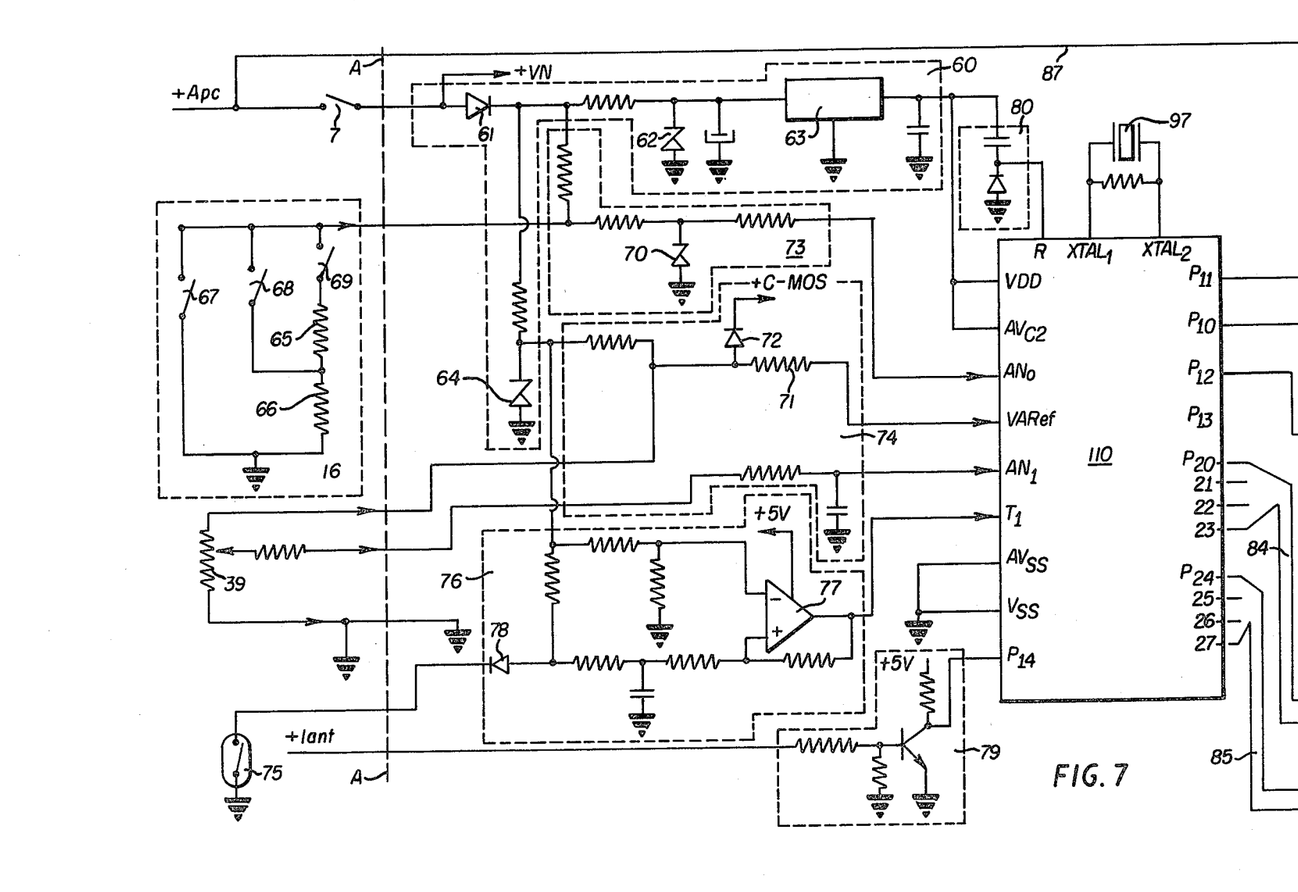
FIGS. 7 and 8 illustrate a detailed embodiment of the electronic circuits of the speed control of FIG. 1.
Figure 8:
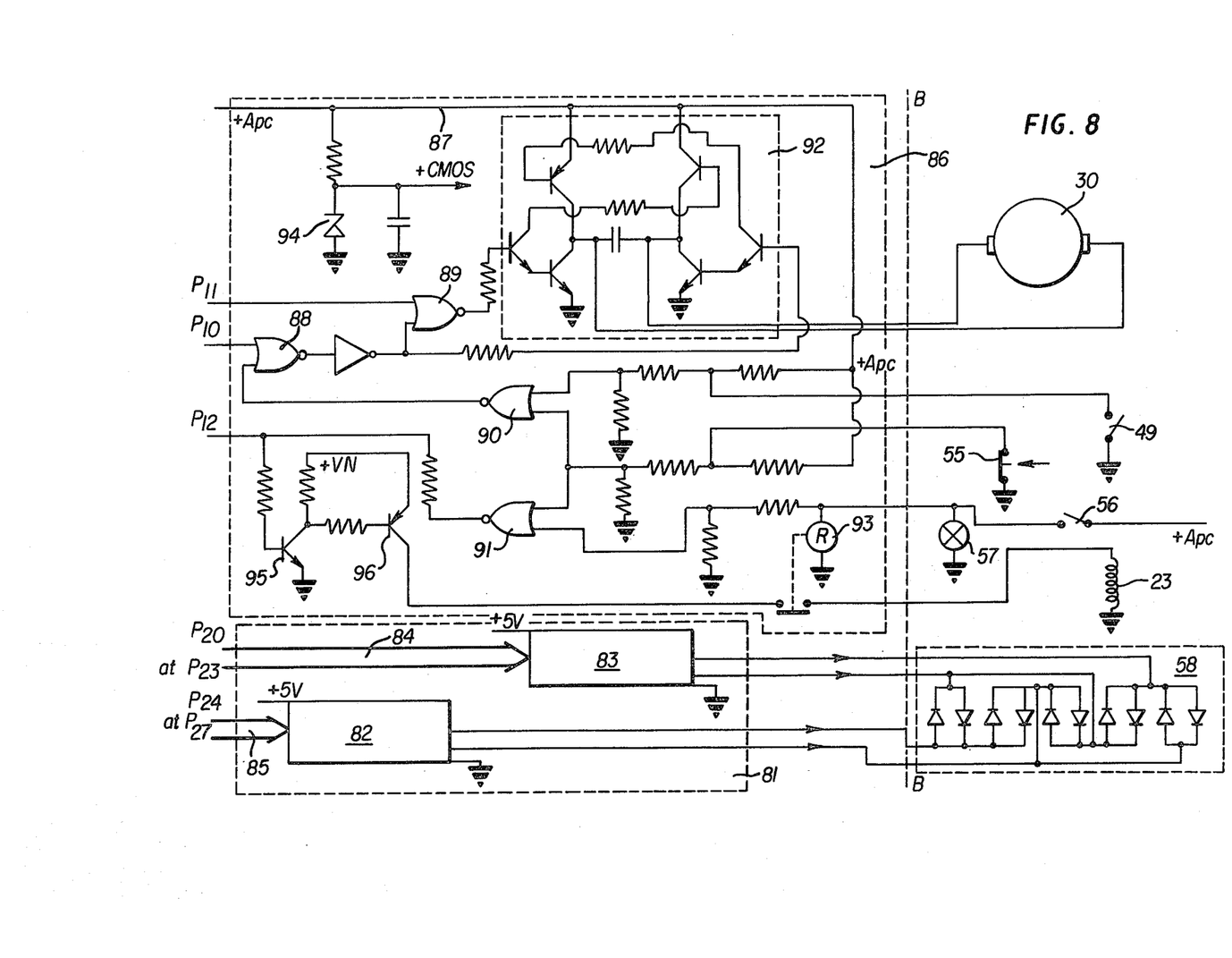

The electronic portion of the invention is disclosed in FIGS. 7 and 8. Considering FIGS. 7 and 8 together by placing them side by side, it can be seen that the electronic portion of the invention comprises three essential parts. The part located in FIG. 7, to the left of the vertical dashed line AA, unifies the input commands using short-throw push-button contacts. The part located in FIG. 8, to the right of vertical dashed line BB, unifies the elements that are controlled, such as: motorized reduction gear 30; slackness detector 49; clutch disengagement switch 55; brake switch 56 connected by one of its terminals to the "post-contact positive" terminal of the vehicle and over which stop lamp 57 is connected to ground; blocking electromagnet 23; and a display device using electroluminescent diodes 58. The central part of FIGS. 7 and 8 between the vertical dashed lines (AA and BB) may consist of a service panel organizing the set of electronic components necessary for production of the various control signals and comprising, as its central element, electronic computer 110, constructed, as stated above, using a type 8022 Intel microcomputer having an integrated analog-digital converter. The microcomputer comprises 64 RAM octets and 2048 ROM octets, an internal time-base or event counter, and a clock with oscillator. This circuit can carry out more than 70 instructions.

At the top-left of FIG. 7 is located on-off switch 7, already mentioned with regard to FIG. 1, which is connected through one terminal to the "post-contact positive" of the vehicle, and by the second terminal to the input of a power circuit 60 comprising, among other elements, a protection diode 61 in series with switch 7 for conveying the power supply for computer 110, a diode 62 for protection against overvoltages, a 5-volt voltage regulator 63, as well as a 10-volt voltage reference constructed by means of a Zener diode 64 which obtains the voltage reference of the integrated analog-digital converter in microcomputer 110 and for the speedometer signal formation circuit.

Below on-off switch 7 of FIG. 7 is found circuit 16 for external speed selection or blocking commands, in which the commutation of two resistances 65 and 66, by means of switches 67, 68 and 69, enables selection of four voltage bands over input $AN_O$ of the integrated analog-digital converter of computer 110. A 4.7 V Zener diode 70 enables the voltage to be limited if none of the commands is chosen. Below external command circuit 16 is found potentiometer 39 of FIG. 3, giving a voltage corresponding to the position of the accelerator pedal. This potentiometer is, for example, of the four kilo-ohm linear rotating type supplied by the Bendix Corporation (U.S.A.). In order to obtain from the ten-volt reference supplied by Zener diode 64, voltage reference VA (reference of the integrated analog-digital converter in microcomputer 110), a voltage divider is provided comprising, in particular, a resistance 71 in series with resistance 39 of the potentiometer supplying voltage corresponding to the position of the accelerator pedal. A diode 72, connected to a permanent "positive CMOS" supply voltage through logic circuits of the motor control block, provides simple protection against overvoltages. Control diode 64 plays a similar role.

The circuit contained inside dashed line 73 in FIG. 7 constitutes the circuit for forming speed selection and blocking signals emitted from circuit 16, while the circuit contained inside dashed line 74 of FIG. 7 constitutes the circuit for formation of the signal, corresponding to the position of the accelerator pedal, emitted from potentiometer 39.

A reed relay 75 represents speed sensor 12 of FIG. 1. It is followed by a formation circuit 76, contained within dashed lines in FIG. 7, and including a trigger circuit using, in particular, an operational amplifier 77. At the input of said formation circuit 76 can be noted a diode 78 enabling separation of various users, if several users are simultaneously using the same sensor 75.

A "positive lights" interface circuit 79 enables the "positive lights" voltage to be adapted to a level compatible with that of microcomputer 110. FIG. 7 further shows an interface 80 for clearing microcomputer 110 and connected through its output to input R of the microcomputer.

In FIG. 8, a display interface 81 comprises two 3-state circuits 82 and 83, with reference number 74125 in the National Semiconductor catalogue, enabling control of one of twelve diodes within circuit 58. For example, three-state circuit 83 is connected by four parallel conductors 84 to outputs $P_{20}$ to $P_{23}$ of microcomputer 110, while three-state circuit 82 is connected in analogous fashion by four parallel conductors 85 to outputs $P_{24}$ to $P_{27}$ of microcomputer 110. Instead of three-state circuits 82 and 83, equivalent circuits could just as well be used, e.g., Channel N and Channel P adapter circuits joined to a network of resistances for limiting current. The latter circuits carry reference numbers 74C907 and 74C906 in the National Semiconductor catalogue. The circuit for control of motor 30 and blocking systems 49, 55, 56 and 23, is contained inside dashed line 86. It is supplied at the "post-contact positive" voltage by conductor 87, which also appears in the upper part of FIG. 7.

CMOS logic gates 88, 89, 90 and 91 (reference number 74C02 in the National Semiconductor catalogue) enable:

the two branches of one side of bridge 92 controlling motor 30 not to be activated at the same time;

motor 30 to be ordered in the direction of opening butterfly valve 14 if there is a grounded slackness command 49, provided that the clutch is not disengaged;

blocking command 23 to be impeded, at 56 in the case of braking, and at 55 in the case of disengagement of the clutch.

A security relay 93 enables the control connection to electromagnet 23 to be cut if the brakes are supplied, in the case where the control transistors for blocking electromagnet 23 are short-circuited. Diode 94, at the top-left of control circuit 86, like diode 64, stops parasitic disturbance coming from the engine compartment, so as to protect microcomputer 110, as well as enable simple supply of the CMOS circuits.

Microcomputer 110 delivers, over its input-output $P_{12}$, connected to the output of gate 91 (FIG. 8), a blocking command which is active at a high level and which may be forced to a low level externally, in the case of braking or disengagement of the clutch. Under the latter hypothesis, electromagnet 23 is de-excited through control transistors 95 and 96 and, at the same time, the low level is recognized by microcomputer 110, which repositions itself into a non-blocked condition.

In FIG. 7, a quartz 97, working at the frequency of 3 MHz, is connected between tabs $XTAL_1$ and $XTAL_2$ of microcomputer 110. It enables its inner clock, at the output of the prescaler, to deliver a pulse every 320 $\mu$s which increments the inner counter used as a time counter. Every sixteen pulses, i.e., every 5.12 ms, an interruption is generated. This interruption in turn increments a time register which is cleared when it reaches a value of 130. This enables determination of a machine cycle of:

$$130 \times 5.12 = 665 \text{ ms.}$$

The main program is reinitiated every 665 ms. It comprises:

(a) measurement of speed, made over an integer number of shaft revolutions, over a maximum of 400 ms (time register=78), at a rate of six pulses per revolution; the minimum speed measured is 36 km/h;

(b) preselection of stop speed $V_B$ following the first speed measurement. The stop speed is adjusted to the real speed, rounded to the higher multiple of 10 if $V_2$ (the real speed of the vehicle at a given moment) is greater than or equal to 90 km/h; if not $V_B=90$ km/h with max. $V_B=150$ km/h;

(c) blocking order if the accelerator pedal is in stop position, corresponding to the friction point (pedal travel $C_0 > 60\%$) and if the real speed $V_2$ of the vehicle is greater than 0.75 $V_B - 10$ km, with a maximum of 50 km/h;

(d) automatic recalibration of potentiometer 39 if a blocking order occurs, or if one accelerates or decelerates to a value $C_3$ for $C_1$ earlier placed in memory during a blocked period at stabilized speed, corresponding to the equation X=0 as set forth below:

(e) modification of the stop speed if one is blocked and accelerates or decelerates manually, in which case:

$$V_B = V_0 = V_2 \pm 10 \text{ km,}$$

with $V_B$ max. $=150$ km/h and $V_B$ min. $=55$ km/h. $V_0$ is the control speed and $V_2$ is the real speed of the vehicle;

(f) computation of control speed $V_0$ as a function of $V_B$ and pedal travel $C_0$ (256 steps of definition) with, at the outset: $C_1=65\%$ of total travel, or $C_3$ following recalibration, and $C_2=C_1+5\%$.

Then if $C_0<C_1$, one obtains $V_0=(V_B-50)C_0/C_1+50$ km/h. If $C_1 \leq C_0 \leq C_2$, one obtains $V_0=V_B$. If $C_0>C_2$, one obtains $V_0=(180-V_B)/(255-C_2)(C_0-C_2)+V_B$;

(g) computation of the control function:

$$X = \frac{1}{4}[V_2 - V_0 + 3(V_2 - V_1) + C] \quad (1)$$

with $V_2$=real speed at a given moment, $V_1$=real speed in the preceding cycle, $V_0$=control speed, C=coefficient having the value 4 if the quantity $(V_2-V_1)$ is greater than or equal to one (1) during at least four successive measurements, which corresponds to an acceleration greater than 0.4 m/s$^2$;

(h) creation of imaginary stops if $|X| \geq 8$, in which case two commands at 665 ms intervals at value 8 are given, followed by six commands at value 4, then n commands at value 3 as long as $|X| \geq 8$ persists and the sign of X has not been changed;

(i) beginning of control of motor 30 over outputs $P_{10}$ and $P_{11}$ of microcomputer 110 upon completion of computations if X is not zero, and computation of time TEM for ending control of motor 30 according to a principle stored in memory. For each computational step there is a corresponding control time;

(j) display of stop speed $V_B$. In the case of manual acceleration or deceleration during blocking, the displayed speed is the real speed of the vehicle $V_2$. Display takes place at increments of 10±5 km; and (k) automatic readjustment of $V_B$ to the multiple of 10 displayed upon termination of blocking.

The interruption program piloted by the inner counter takes place every 5.12 ms. It comprises:

Study of the external commands originating from circuit 16; stop speed selection and blocking order over input $AN_0$ of microcomputer 110 with antiparasitic action internal to the software; two successive measurements over eight definitional bits must be identical ±1 unit.

In the case of a non-blocked pedal, the speed selection command enables sequential stop speed selection command by 10 km increments from 60 to 150 km/h.

In the case of a blocked pedal, the speed selection command enables controlled manual acceleration or deceleration.

Forcing of the motor command during n timer interruptions generated by the inner counter if there is a new speed selection command or another acceleration or deceleration (n=6, thus 30 ms), as well as appropriate change in display 58.

Recognition, if previously blocked, of unblocking by the electromagnet (23) through input $P_{12}$ of microcomputer 110 following braking or disengagement of the clutch.

Unblocking by electromagnet 23 if the principal program no longer supplies the blocking order.

Blocking or unblocking in the case where there is an external blocking command, with the preceding conditions being fulfilled.

Study of the position of pedal $C_0$ over analog input $AN_1$ of microcomputer 110, with internal antiparasitic action of the software, over two successive eight-bit measurements.

Change in the cyclic ratio controlling electroluminescent diode display 58 from outputs $P_{20}$ to $P_{27}$ if there is a high level over tab $P_{14}$ of microcomputer 110, connected to the "positive lights" voltage.

Incrementation of the "time" register, with a maximum of 130, and command of motor 30 if the time is equal to TEM, given by the main program, as well as command of an inverse pulse for stopping the motor after TEM (approximately 2 ms) by stopping the program and using the internal counter.

Upon completion of this interruption sub-program, microcomputer 110 returns to the main program at the point at which it was interrupted. The programs for searching for external commands, forcing the command of motor 30, and commanding blockings and unblockings alternate with the programs for examining the position of the pedal and changing display 58 (if "positive lights" obtains at $P_{14}$). The foregoing alternation occurs every 10.24 ms in order to reduce interruption time.

The speed control of the present invention, effected by control block 13 located between the butterfly valve cable 3 and the accelerator cable 2, is thus effectively inserted within the pedal 1/butterfly valve 14 connection so as to modify the length of the connection in terms of a control speed chosen by the driver.

The accelerator pedal possesses a friction point located two-thirds through its travel and corresponds to a modification of the force required for depressing the pedal. The pedal is graduated in speed, with 256 steps of definition. The friction point corresponds to the speed preselected by the driver by means of sequential command 16, at increments of 10 km/h from 60 to 150 km/h. Electroluminescent diode display 58 on the speedometer enables visualization of the speed preselected for the friction point. For every position of the pedal there is a corresponding control speed between 50 km/h (foot off) and 180 km/h (foot to the floor).

The driver has the option of blocking the pedal in "friction point" position by action of electromagnet 23, so as to travel at the preselected speed. In this case, speed selection commands 16 enable controlled acceleration or deceleration. In the case of a manual transmission, blocking is eliminated if the driver brakes or disengages the clutch.

Computer 110 gives orders to electric motor 30 in order to change the length of the series connection from pedal 1 to butterfly valve 14. The computer controls electromagnet 23 for blocking the pedal. Contact 49, labeled "slackness contact," inside control block 13 enables the pedal 1/butterfly valve 14 connection to be kept under constant tension.

In the case of an automatic transmission, the kickdown switch is placed between the control block (13) and butterfly valve 14.

The operation of the control device of the invention will now be explained using FIG. 9, which represents several curves linking the control speed $V_0$ (in km/h) to the travel of the pedal C (expressed in % of its total travel). As stated earlier, the accelerator pedal is graduated in speed between 50 and 180 km/h. The stop point, or stop, corresponds to a speed $V_B$ selected by the driver. The friction point is situated at $C_1\%$ of the travel of the pedal. A dead band from $C_1\%$ to $C_2\%$ is formed beyond the friction point. We may take, for example, $C_1=65\%$ and $C_2=70\%$.

For every position of the accelerator pedal there is a corresponding control speed $V_0$, a function of speed $V_B$ (stop speed), preselected using sequential command 16 of FIG. 1 at 10 km increments between 60 and 150 km/h with the aid of push-button switches.

Logic antiparasitic action is carried out at the level of the commands so as to avoid rebounding. To be accepted, every command must remain at a given level for at least 20 ms.

In the case of blocking of the pedal in the stop or friction point position, two switches of speed selection control 16 then enable a controlled acceleration or deceleration to be ordered, taking $V_0$=at $V_2\pm 10$ km. Upon completion of this acceleration or deceleration, $V_0$ is held at $V_3\pm 3$ km where $V_3$ is the speed of the vehicle after acceleration or deceleration.

A third push-button switch in control 16 enables the accelerator pedal to be blocked or unblocked in stop or friction point position, provided that:

the pedal is in stop position, i.e., $C_0>60\%$ of the travel of the pedal;

the speed of the vehicle $V_2$ is greater than 50 km/h;

the speed of the vehicle $V_2$ is also greater than a certain value, a function of step speed $V_B$:

$$V_2 > 0.75 V_B - 10.$$

There is unblocking in the case of an automatic transmission if the brakes are activated or if the clutch is disengaged, or automatically if one of the above-noted three conditions is no longer met. This constitutes an additional safety measure in case brake switch 56 is no longer operating.

With regard to display of the stop speed by diodes 58, if the lights have just been turned on, computer 110 modifies the cyclic ratio controlling the diodes so as to diminish their luminous intensity. In the case of blocking, the speed displayed is the speed of the vehicle ±5 km/h.

If, following an acceleration or deceleration, the stop speed and control speed (in blocked configuration) were 87 km/h, electroluminescent diode 90 would be activated. The latter corresponds to the band 86 km/h⇌95 km/h. After unblocking, the stop speed is recalibrated to the speed which corresponds to the activated electroluminescent diode, i.e., 90 km/h in the present example.

Measurement of the speed of the vehicle is made with greater precision than km/h. Computations are made to the nearest km/h. The microcomputer (110) takes a measurement every 665 ms using a whole number of speedometer cable revolutions leaving the transmission. This measurement cannot last longer than 400 ms. After measurement of the real speed $V_2$ of the vehicle, computer 110 calculates the control speed $V_o$, as a function of the position of the pedal according to the representation in FIG. 9, then computes quantity X in accordance with equation (1) above.

For each value X there is a corresponding electric motor (30) control time, which is a function of a principle of opening stored in the memory of the computer. There are eight positive command steps and eight negative steps according to one particular embodiment, which enables a half-degree of opening of the carburetor to be obtained for the finest step and full opening in 0.7s, supposing the motor is continuously supplied. Upon termination of each command, an inverse pulse is sent by computer 110 to stop the motor.

There are no limits of travel in the control block. In order to replace them electronically, where quantity X is greater than or equal to 8 in absolute value, two commands are given at the eighth step, following by six at the fourth step and n at the third for as long as $|X|\geq 8$.

Each time an increased or decreased speed selection, or an acceleration or deceleration, is ordered, the motor is forced either to open or to close the butterfly valve for a given time so as to react immediately and anticipate the order furnished by the computer with the new reference instruction.

Outside computer 110, if the "slackness" contact (49) closes, motor 30 is controlled independently from any other command in order to immediately recover the accelerator pedal position. This is the case, e.g., with a lifting of the foot. In case of disengagement of the clutch, the slackness order is inhibited.

With the application of tension, there is automatic adjustment of the stop speed to the 10 km multiple directly higher than the speed of the vehicle if the latter is traveling at more than 90 km/h; if not, there is adjustment to 90 km/h.

There is automatic readjustment of potentiometer 39 if the pedal is blocked at stop and one accelerates or decelerates manually, in the case where position $C_0$ of the pedal is different from $C_1$. In this case:

if one is in blocked pedal configuration at stabilized speed (X=0), $C_3$ is placed in memory, the value of $C_0$ corresponding to the step pedal position;

if one accelerates or decelerates manually, one changes the value of $C_1$, initially set at 65%, into value $C_3$, and $C_2$ into $C_3+5\%$. There is thus an automatic recalibration without intervention by the driver.

It follows naturally that the device of the invention applies equally well to a diesel or fuel injection engine, and, more generally, to any engine the power of which is controlled by a mechanical system. It is possible to use the speed control in conjunction with a clock circuit supplied from the positive battery terminal, either within the microcomputer or external to it, e.g., Motorola type MC 146818 serves as a time-base for the microcomputer and enables, through use of a digital display, a display of either the time, the stop speed, the reference speed, the real speed, or even the average speed of the vehicle over a certain distance.

Obviously, many modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. In a speed control for an engine of an automobile having an accelerator pedal, a speed sensor, and a butterfly valve, which is capable of serving as a driving aid, the improvement comprising:

a depressible return means for opposing, with a limited force equal to or greater than a predetermined value, the depression force exerted by the driver against the accelerator pedal as soon as the latter exceeds, in its position, a predetermined value; an electronic computer connected to means for selecting a reference speed and to means for display of said preselected reference speed; a potentiometer the movable part of which is dependent upon said accelerator pedal, and the output of which is connected to the electronic computer, the outputs of which are in turn connected to an electric motor which directly controls the angular displacements of the butterfly valve, in which the depressive force of said accelerator pedal corresponds to a first value over a given length of travel of said pedal, and to a second value, higher than the first, over the remaining travel of said accelerator pedal, creating a friction point at a given point in the travel of said accelerator pedal, corresponding to passage from a first depressive force to a second higher than the first, in which the displacements of said accelerator pedal are graduated in speed; a mechanical connection between said accelerator pedal and said butterfly valve, incorporating a control block, controlled by the electronic computer, wherein said control block includes an epicyclic train controlled by a motorized reduction gear, a recopy potentiometer, and a blade turning about the axis of symmetry of said epicyclic train.

2. A speed control according to claim 1, wherein said control block further includes a blocking electromagnet for blocking said accelerator pedal in the position corresponding to the friction point.

3. A speed control according to claim 1, wherein said friction point corresponds to a speed preselected by the driver using selection commands constituting a stop speed (VB).

4. A speed control according to either claim 1, 2 or 3, wherein said control block further includes a contact for detecting the presence of slack in a cable in that portion of the mechanical connection which is connected to said butterfly valve and for enabling the connection between said accelerator pedal and said butterfly valve to be kept constantly under tension.

5. A speed control according to claim 3, being of the type comprising manual acceleration control and manual deceleration control, wherein when the accelerator pedal is blocked, the speed preselection commands are used in manual acceleration control and manual deceleration control.

6. A speed control according to claim 3, wherein said friction point is followed in the travel path of said accelerator pedal by a dead band corresponding to approximately 5% of the total travel of said pedal.

7. A speed control according to claim 2, further including an electronic circuit connecting an output of the microcomputer to an excitation winding of the blocking electromagnet; said electronic circuit being constructed in such a manner that if the clutch is disengaged or if the brakes are applied, the voltage over said output from said microcomputer to said excitation winding is forced from a high state into a low state to thereby disable the blocking electromagnet; this information is recovered by said microcomputer so that its output returns to zero, said output to said excitation winding serving as both output and input for said microcomputer to recover the information sent to said excitation winding and to thereby return said output to zero.

8. A speed control according to claim 1, wherein upon termination of each succession of control pulses from said electric motor, operating as a function of a law governing opening of the butterfly valve stored in memory in said microcomputer, said microcomputer sends an inverse polarity pulse so as to stop said motor.

9. A speed control according to claim 4, further including an electronic control circuit for said motor that is connected to the detector for detecting slackness in such a way that, from outside said microcomputer, if the slackness contact closes, said motor is commanded instantaneously and independently from any other command to recover immediately the position of said accelerator pedal in its travel.

10. A speed control according to claim 5, wherein said recopy potentiometer is automatically recalibrated, in the case of blocking, at the moment a manual acceleration or deceleration command is received.

11. A speed control according to claim 3, wherein the stop speed (VB) is automatically readjusted to the speed displayed at the moment of unblocking.

12. A speed control according to claim 3, wherein upon start-up of said computer, an automatic selection of the stop speed (VB) is made by said computer as a function of the real speed of the vehicle, such that between zero and a predetermined speed in the computer, said predetermined speed is displayed and beyond this predetermined value, the speed corresponding to the multiple of ten immediately higher than the real speed of the vehicle is displayed.

* * * * *